US007016130B2

(12) United States Patent
Hong

(10) Patent No.: US 7,016,130 B2
(45) Date of Patent: Mar. 21, 2006

(54) METHOD FOR RECORDING AND REPRODUCING AUDIO AND VIDEO DATA IN DISK DRIVE, AND A READABLE MEDIUM THEREFOR

(75) Inventor: Joo-sun Hong, Suwon-si (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 176 days.

(21) Appl. No.: 10/405,037

(22) Filed: Apr. 2, 2003

(65) Prior Publication Data

US 2003/0231873 A1 Dec. 18, 2003

(30) Foreign Application Priority Data

Apr. 13, 2002 (KR) .............................. 2002-20239

(51) Int. Cl.
*G11B 27/36* (2006.01)
(52) U.S. Cl. ....................................................... 360/31
(58) Field of Classification Search .................. 360/31, 360/53, 51
See application file for complete search history.

(56) References Cited

U.S. PATENT DOCUMENTS 5,001,568 A * 3/1991 Efron et al. ................... 360/25
5,675,586 A * 10/1997 Sako et al. .................... 360/53
5,909,334 A * 6/1999 Barr et al. ..................... 360/31
6,223,310 B1 * 4/2001 Sasaki et al. .................. 360/53
6,606,211 B1 * 8/2003 Lim et al. ...................... 360/53
6,781,780 B1 * 8/2004 Codilian ........................ 360/53

FOREIGN PATENT DOCUMENTS

| CN | 1209899 A | 3/1999 |
| JP | 5-28646 A | 2/1993 |
| KR | 1998-063198 A | 10/1998 |

* cited by examiner

*Primary Examiner*—David Hudspeth
*Assistant Examiner*—Glenda P. Rodriguez
(74) *Attorney, Agent, or Firm*—Sughrue Mion, PLLC

(57) ABSTRACT

A method for recording and reproducing data, and more particularly, a method for recording and reproducing audio/video data in the disk drive where, if an error occurs in performing an audio/video data recording and reproducing process, a sector where the error occurs is detected to perform a defect process, and a computer-readable recording medium therefor, are provided. If an error occurs while the audio/video data is being recorded or reproduced by the hard disk drive, the method includes processing bad sectors by the defect process, controlling the hard disk drive to continuously perform audio/video data recording or reproducing for the sectors following the bad sector, so that it is possible to perform real-time recording or reproducing of audio/video data while maintaining continuity of the data, even when errors occur. In particular, it is possible to prevent an A/V processor from stopping when an error occurs.

18 Claims, 3 Drawing Sheets

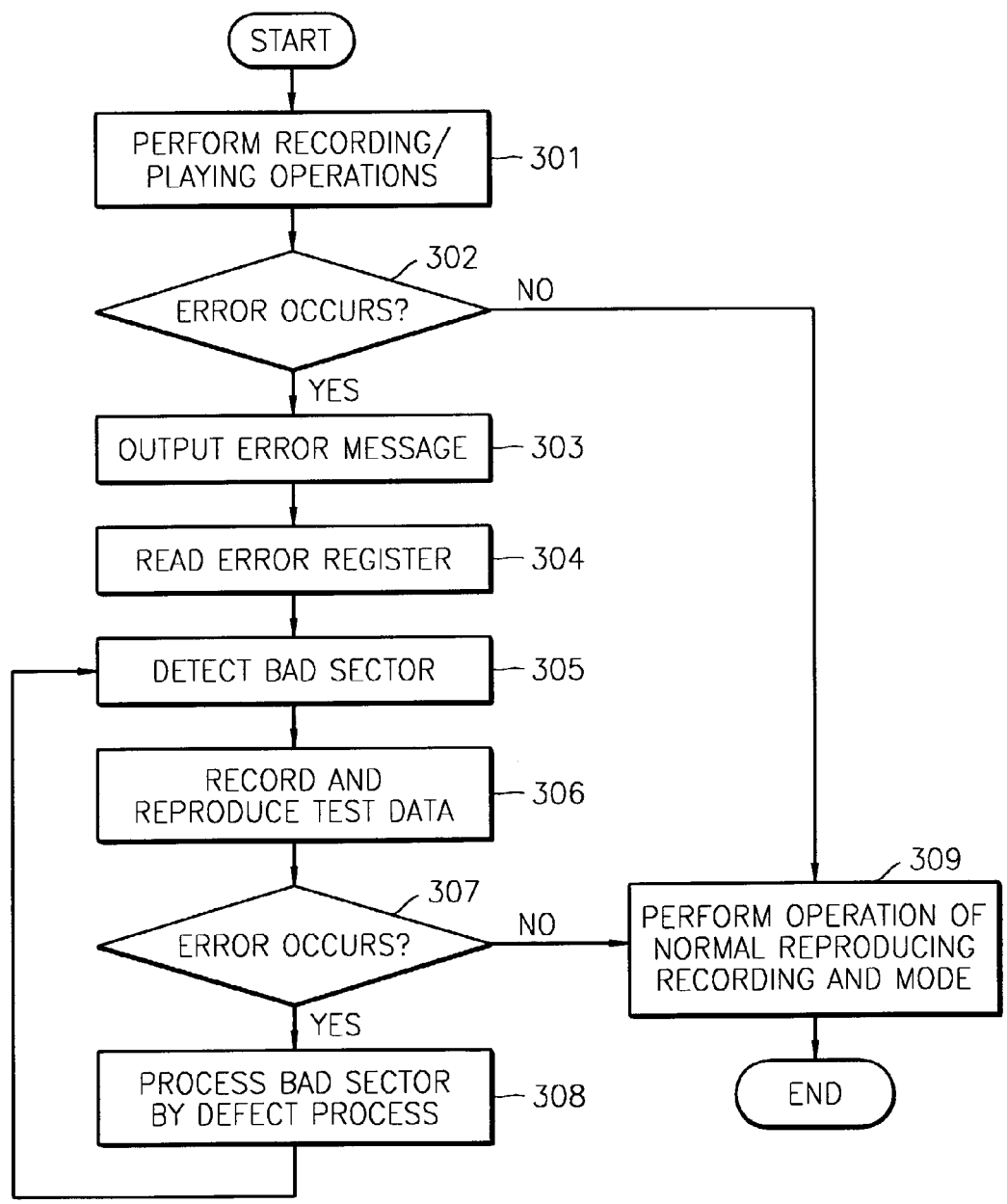

METHOD FOR RECORDING AND REPRODUCING AUDIO AND VIDEO DATA IN DISK DRIVE, AND A READABLE MEDIUM THEREFOR

This application claims the priority of Korean Patent Application No. 2002-20239, filed on Apr. 13, 2002, in the Korean Intellectual Property Office, the disclosure of which is incorporated herein in its entirety by reference.

BACKGROUND OF THE INVENTION

1. Field of the Invention

The present invention relates to a method for recording and reproducing data in a disk drive, and more particularly, to a method for recording and reproducing audio/video (A/V) data in a disk drive for effectively processing a defect and a signal when the A/V data is recorded or reproduced while reflecting a linear characteristic of the A/V data, and a computer-readable recording medium therefor.

2. Description of the Related Art

Conventional hard disk drives used in apparatuses such as personal computers have been used to record various application programs and data. Recently, due to increases in the recording capacity of hard disk drives, they are being used to store and reproduce real-time audio/video data.

In general, some parts of a disk included in the hard disk drive may be damaged by external shocks, dust, scratches and deterioration of elements such as heads, during the use of the disk. As a result, errors occur in recording and reproducing data in the damaged parts.

According to prior art, if an error occurs in a host, e.g., a personal computer when the data is recorded and reproduced, the hard disk drive retries the recording and reproducing of the data. Nevertheless, if the errors are not removed, the disk drive seeks another space of the disk and performs recording and reproducing operations. The audio/video (A/V) data has a linear characteristic and is required to be recorded and reproduced in real-time. However, data discontinuity due to delays in seeking causes degradation of recording and reproducing operations. Also, an A/V processor sometimes stops at places where errors occur.

SUMMARY OF THE INVENTION

It is an object of the present invention to provide a method for recording and reproducing audio/video data in a disk drive, which can effectively process a defect and perform operations of a recording and reproducing mode if errors occur during an audio/video data recording and reproducing process.

In one aspect, the present invention provides a method for recording data of a disk drive, the method comprising (a) determining whether an error occurs in an audio/video data recording or reproducing mode, (b) detecting a sector of a disk region where the error occurs, if it is determined in step (a) that an error has occurred, (c) processing the sector detected in step (b) by a defect process and (d) continuously recording or reproducing data sectors following the sector which is processed by the defect process.

In another aspect, the present invention relates to a computer-readable recording medium for providing the method as described above.

BRIEF DESCRIPTION OF THE DRAWINGS

The above objects and advantages of the present invention will become more apparent by describing in detail a preferred embodiment thereof with reference to the attached drawings in which:

FIG. 3 is a flowchart showing a method for recording and reproducing audio/video data in the disk drive according to the present invention.

DETAILED DESCRIPTION OF THE INVENTION

Figure 1:
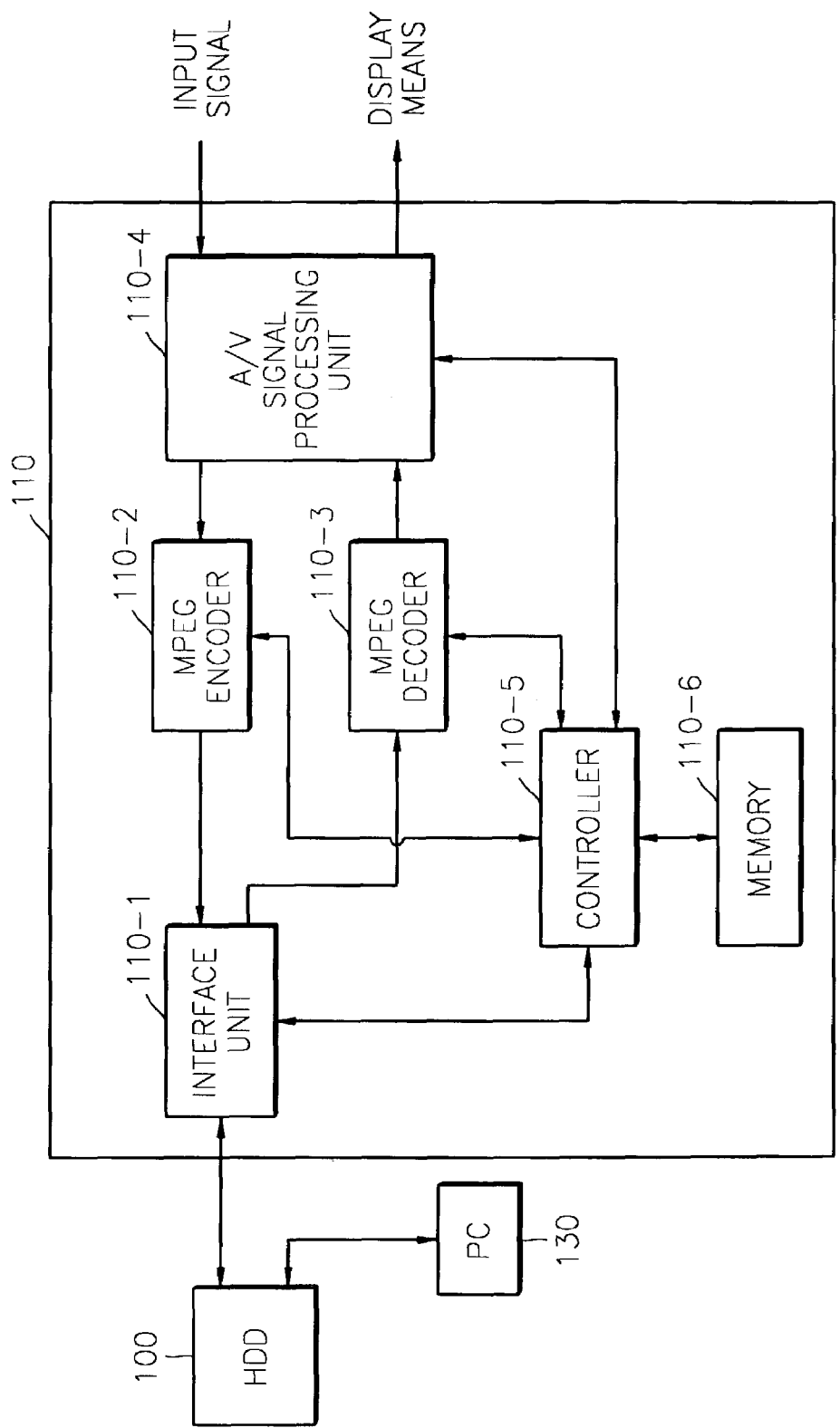
FIG. 1 is a view of a configuration of an audio/video recording and reproducing system according to the present invention.

The present invention now will be described more fully with reference to the accompanying drawings, in which preferred embodiments of the invention are shown. In the drawings, like reference numerals are used to refer to like elements throughout.

As shown in FIG. 1, an audio/video recording and reproducing system to which a method according to the present invention is applied includes a hard disk drive 100, a signal processing device 110 and a personal computer 130.

The hard disk drive 100 is separated from the signal processing device 110 in one embodiment of the present invention. However, it is also possible to apply the present invention to a circuit configuration in which the hard disk drive 100 is included in the signal processing device 110.

More specifically, the signal processing device 110 includes an interface unit 110-1, an MPEG encoder 110-2, an MPEG decoder 110-3, an A/V(Audio/Video) signal processing unit 110-4, a controller 110-5 and a memory 110-6.

The A/V signal processing unit 110-4 converts inputted analog A/V signals into digital signals and performs signal processing for converting decoded audio/video data from the hard disk drive 100 into a signal which is output to a displaying means and a speaker (not shown).

The MPEG encoder 110-2 performs an encoding process by which an A/V signal converted into a digital signal through the A/V signal processing unit 110-4 in a recording mode of the hard disk drive 100 is compressed according to the MPEG standard.

The MPEG decoder 110-3, where A/V stream data from the hard disk drive 100 is divided into audio data and video data, decodes the data and outputs the decoded data to the A/V signal processing unit 110-4.

The interface unit 110-1 performs input/output interfacing so as to enable data communication with the hard disk drive 100.

The controller 110-5 controls the whole signal processing device 110 and adjacent circuit means (not shown) to perform signal processing for recording and reproducing in response to a key command input from an input means (not shown), and functions as a master controller by using the hard disk drive 100 as a slave.

Figure 2:
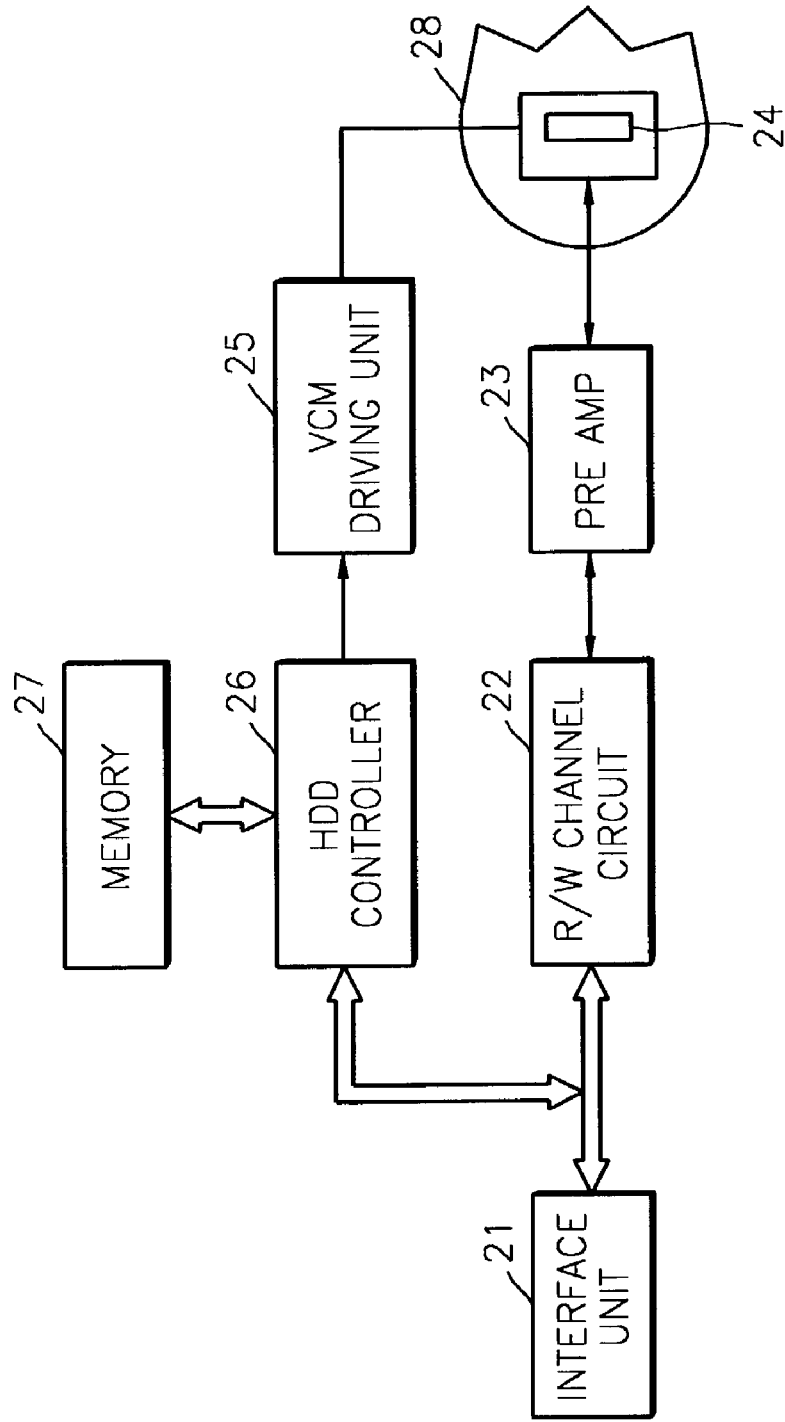
FIG. 2 is an enlarged view of a configuration of a hard disk drive of FIG. 1.

The hard disk drive 100, shown in FIG. 2 includes an interface unit 21, a read/write (R/W) channel circuit 22, a pre amp circuit 23, a transducer 24 for recording or reproducing data in a disk 28, a voice coil motor (VCM) driving unit 25, a HDD controller 26 and a memory 27.

The HDD controller 26 supplies a control signal to the R/W channel circuit 22 so as to read information from the disk 28 or record information in the disk 28. Typically, the information is transmitted to the interface unit 21 from the R/W channel circuit 22. The interface unit 21 includes a buffer memory and a control circuit which allow the disk drive to interface with a system such as the personal computer 130 or the signal processing device 110, and functions as a slave controller controlled by the controller 110-5 of the signal processing device 110.

The HDD controller 26 is connected to the VCM driving unit 25 and supplies a control signal to the VCM driving unit 25 in order to control excitation of the voice coil motor (not shown) and movement of the transducer 24.

The HDD controller 26 is connected to a non-volatile memory, e.g., a ROM (read only memory) or a flash memory, and a RAM (random access memory). The memory element 27 includes various kinds of control programs and data used by the HDD controller 26 to run a software routine.

Next, in the recording and reproducing system shown in FIG. 1, a case where an error occurs during a process of reproducing the audio/video data in the hard disk drive 100 or recording audio/video data received from the signal processing device 110 is handled by a method which will now be described with reference to a flowchart of FIG. 3.

First, the controller 110-5 in the host, i.e., the signal processing device 110, determines whether there is any error occurrence information in the HDD controller 26 in a process of reproducing audio/video data recorded in the disk or recording audio/video data received from the signal processing device 110 in the disk included in the hard disk drive 100 (steps 301 and 302).

If it is determined that an error has occurred in step 302, the controller 110-5 reads from the memory 110-6 error message data, i.e., user information (UI) for informing the user of the occurrence of an error, converts the error message data into an image signal through the signal processing unit 110-4, and controls the output of the image signal to a displaying means (step 303).

Then, in step 304, the controller 110-5 reads an error occurrence register value of the HDD controller 26 and checks the addresses of the data that is currently recorded or reproduced.

Next, the controller 110-5 detects bad sectors having the address including the error checked in step 304 and transmits a command for sequentially recording test data in the detected bad sectors and reproducing the test data to the hard disk drive 100. Then, the HDD controller 26 controls the location of the transducer 24 according to the transmitted command from the controller 110-5 of the signal processing device 110 to move the transducer 24 on the bad sectors, and determines whether errors occur while recording and reproducing the test data (steps 305 through 307). Here, it is possible to program operations of the HDD controller 26 so as to detect bad sectors including a predetermined number of the sectors preceding and following the bad sector having the errors and to sequentially record and reproduce the test data in the bad sectors.

If an error occurs in recording and reproducing the test data, a corresponding bad sector is processed by a defect process (step 308). The sector which is processed by the defect process is stored in a bad sector information storage region of a file allocation table in the HDD so that the data is not permanently recorded and reproduced in the sector processed by the defect process. If information on the permanently removed sector which is registered as a bad sector is read and the data is about to be stored or reproduced in a disk region of the registered bad sector when the hard disk drive 100 is rebooted and reads information in the file allocation table, corresponding bad sector is skipped.

After a completion of a test for bad sectors, in which the test data is sequentially recorded in the bad sectors, operations of a normal recording and reproducing mode are performed in sectors following the bad sectors processed by the defect process (step 309). It is possible to program so as to output user information (UI) which asks whether "continuous storing" will be performed or not, after processing of the bad sectors has been completed in the recording mode.

As described above, if an error occurs during the recording/reproducing of data to/from a hard disk drive, bad sectors where the error occurs are processed by a defect process, and the recording/reproducing of A/V data to/from sectors following the bad sectors processed by the defect process is continuously performed, thereby making it possible to perform real-time recording and reproducing of data while maintaining the continuity of the data even when an error occurs in recording and reproducing the A/V data. In particular, it is possible to prevent an A/V processor from stopping when an error occurs.

The present invention can be embodied as a method, an apparatus and a system or the like. When it is embodied as software, elements of the present invention are code segments. The program or code segments can be stored in a processor readable medium or be transmitted by a computer data signal associated with a carrier in transmission medium or a communication network. The processor readable medium may be any medium which is capable of storing or transmitting information, such as an electric circuit, a semiconductor memory device, a ROM, a flash memory, an E2PROM, a floppy disk, an optical disk, a hard disk, an optical fiber medium, a radio frequency (RF) network, or the like. The computer data signal includes any signal which can be transmitted over a transmission medium such as a network channel, an optical fiber, air, an electric field, a radio frequency network, or the like.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A method for recording data of a disk drive, the method comprising:
   (a) determining whether an error occurs in one of a data recording mode and a data reproducing mode;
   (b) detecting a sector of a disk region where the error occurs, if it is determined in step (a) that the error has occurred;
   (c) processing the sector detected in step (b) by a defect process; and
   (d) continuously recording or reproducing data at sectors following the sector which is processed by the defect process.

2. The method of claim 1, wherein step (b) further comprises:
   (b1) reading an address value stored in an error register; and
   (b2) detecting a sector corresponding to the address value read in step (b1).

3. The method of claim 2, wherein step (b2) further comprises detecting sectors preceding and following the sector processed by a defect process.

4. The method of claim 1, wherein, the method further comprises outputting a message informing a user of the occurrence of the error if it is determined in step (a) that the error has occurred.

5. The method of claim 1, wherein the error is a first error and step (c) further comprises:
  (c1) sequentially recording and reproducing test data in the sector in which the first error is detected;
  (c2) determining whether a second error occurs in performing step (c1); and
  (c3) if it is determined in step (c2) that the second error has occurred, registering the sector where the second error occurs as a bad sector.

6. The method of claim 5, wherein the method further comprises, if it is determined in step (c2) that the second error has occurred, outputting user information to check whether continuous storage will be performed or not.

7. The method of claim 1, wherein the data recording mode is at least one of an audio recording mode and a video recording mode, and the data reproducing mode is at least one of an audio reproducing mode and a video reproducing mode.

8. The method of claim 1, wherein in (a), whether an error occurs in the data reproducing mode is determined and wherein in (d), data is continuously reproduced.

9. The method of claim 1, wherein the data recording mode and the data reproducing mode are carried out in realtime.

10. The method of claim 1, wherein the data recording mode of A/V data and the data reproducing mode of A/V data are carried out in realtime while the defect process is carried out.

11. The method of claim 1, wherein if the error occurs in the data recording mode, the recorded data is continuously inputted into the disk drive during the defect process and if the error occurs in the data reproducing mode, the reproduced data is continuously outputted from the disk drive during the defect process.

12. A computer-readable recording medium for recording a computer program code for enabling a computer to provide a service of recording data of a disk drive, the service comprising steps of:
  (a) determining whether an error occurs in one of a data recording mode and a data reproducing mode;
  (b) detecting a sector of a disk region where the error occurs, if it is determined in step (a) that the error has occurred;
  (c) processing the sector detected in step (b) by a defect process; and
  (d) continuously recording or reproducing data at sectors following the sector which is processed by the defect process.

13. The computer-readable recording medium of claim 12, wherein step (b) further comprises:
  (b1) reading an address value stored in an error register; and
  (b2) detecting a sector corresponding to the address value read in step (b1).

14. The computer-readable recording medium of claim 13, wherein step (b2) further comprises detecting sectors preceding and following the sector processed by a defect process.

15. The computer-readable recording medium of claim 12, wherein, the method further comprises outputting a message informing a user of the occurrence of the error if it is determined in step (a) that the error has occurred.

16. The computer-readable recording medium of claim 12, wherein the error is a first error and step (c) further comprises:
  (c1) sequentially recording and reproducing test data in the sector in which the first error is detected;
  (c2) determining whether a second error occurs in performing step (c1); and
  (c3) if it is determined in step (c2) that the second error has occurred, registering the sector where the second error occurs as a bad sector.

17. The computer-readable recording medium of claim 16, wherein the method further comprises, if it is determined in step (c2) that the second error has occurred, outputting user information to check whether continuous storage will be performed or not.

18. The computer-readable recording medium of claim 12, wherein the data recording mode is at least one of an audio recording mode and a video recording mode, and the data reproducing mode is at least one of an audio reproducing mode and a video reproducing mode.

* * * * *